US012763432B2

(12) United States Patent
Lo et al.

(10) Patent No.: US 12,763,432 B2
(45) Date of Patent: Oct. 13, 2026

(54) SEPARATOR

(71) Applicant: BenQ Materials Corporation, Taoyuan (TW)

(72) Inventors: Wan-Ting Lo, Taoyuan (TW); Yi-Ting Lo, Taoyuan (TW); Meng-Chia Cheng, Taoyuan (TW); Tzung Yu Tsai, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 505 days.

(21) Appl. No.: 18/487,098

(22) Filed: Oct. 15, 2023

(65) Prior Publication Data

US 2025/0055136 A1 Feb. 13, 2025

(30) Foreign Application Priority Data

Aug. 11, 2023 (TW) ................................ 112208504

(51) Int. Cl.
*H01M 50/451* (2021.01)
*H01M 50/417* (2021.01)
*H01M 50/491* (2021.01)

(52) U.S. Cl.
CPC ....... *H01M 50/451* (2021.01); *H01M 50/417* (2021.01); *H01M 50/491* (2021.01)

(58) Field of Classification Search
CPC ............ H01M 50/451; H01M 50/417; H01M 50/491; H01M 10/0525; H01M 50/403; H01M 50/414; H01M 50/434; H01M 50/443; H01M 50/446; H01M 50/449; H01M 50/457; H01M 50/489; Y02E 60/10; B32B 3/266; B32B 27/08; B32B 2307/7376; B32B 27/32
See application file for complete search history.

(56) References Cited

PUBLICATIONS

"Separator technologies for lithium ion batteries," (Huang), J. Solid State Electrochem. p. 649-662, Dec. 30, 2010 (Year: 2010).*
Enhanced wetting properties of polypropylene separator for a lithium ion battery by hyperthermal hydrogen induced cross linking of polyethylene oxide, (Man), Journal of Materials Chem., p. 11980-11986, 2014 (Year: 2014).*

* cited by examiner

*Primary Examiner* — Ula C Ruddock
*Assistant Examiner* — Sarika Gupta

(57) ABSTRACT

A separator is disclosed. The separator comprises a porous polyolefin substrate with a plurality of porous structures on the surfaces and interior thereof, and an anti-thermal shrinkage thin layer formed on the surfaces and the sidewalls of the porous structures of the porous polyolefin substrate. The present separator can provide enhanced high temperature shrinkage resistance and electrolyte wettability.

6 Claims, 2 Drawing Sheets

200

200

SEPARATOR

CROSS-REFERENCE TO RELATED APPLICATION

This application claims the benefit of Taiwanese patent application serial No. 112208504, filed on Aug. 11, 2023, the subject matter of which is incorporated herein by reference.

BACKGROUND OF THE INVENTION

Field of Invention

This invention relates to a separator for the lithium battery, and more particularly to a low thermal shrinkage separator for the lithium battery.

Description of Related Art

With the development of the consumer electronics, wearable devices, electric vehicles and industrial energy storage fields, the requirements of safety and energy density of the lithium battery also increase. As an important insulating porous material in the lithium battery, the physical properties of the separator need to be further improved.

The separator of the lithium-ion battery is made of polyolefin materials, such as, polyethylene (PE) or polypropylene (PP) and is mainly manufactured by dry-stretching or wet-stretching. The two methods basically are to melt a polymer resin to extrude the molten polymer resin into a film, and then stretch the film to form appropriate pores therein by dry-stretching or wet stretching. The dry-stretched separator is usually thicker and can be stacked in multi-layers with high safety and low cost under high power. The wet-stretched separator is suitable for coating a ceramic coating on the surface of a polyolefin substrate to form a composite separator due to its thin thickness, high porosity and uniform pore size. Compared with the wet-stretched separator, the dry-stretched separator has certain advantages in mechanical properties, ion permeability and chemical resistance of electrolyte, and is widely used in ternary lithium batteries with high energy density. However, when the temperature of the lithium-ion battery exceeds 130° C., the shrinkage of the dry-stretched separator will easily cause the electrodes of the lithium-ion battery to directly contact each other and cause a short circuit. Therefore, the dry-stretched separator needs to overcome the disadvantages of high thermal shrinkage and poor electrolyte wettability.

SUMMARY OF THE INVENTION

The present invention discloses a separator with a low thermal shrinkage and an enhanced electrolyte wettability for the lithium battery. The present separator comprising a porous polyolefin substrate with a plurality of porous structures on the surfaces and interior thereof; and an anti-thermal shrinkage thin layer formed on the surfaces and the sidewalls of the porous structures of the porous polyolefin substrate.

In an embodiment of the present invention, the porous polyolefin substrate is a single-layered polyethylene film, a single-layered polypropylene film, a double-layered polyethylene/polypropylene film or a triple-layered polypropylene/polyethylene/polypropylene film.

In an embodiment of the present invention, the anti-thermal shrinkage thin layer is a composite layer of hexamethyldisilazane and titanium oxide and/or titanium hydroxide.

In an embodiment of the present invention, the anti-thermal shrinkage thin layer is a composite layer of cross-linked polyolefin, photo-reactive agent, hexamethyldisilazane and titanium oxide and/or titanium hydroxide.

In an embodiment of the present invention, the thickness of the porous polyolefin substrate is ranging between 5 μm and 30 μm.

In an embodiment of the present invention, the porosity of the porous polyolefin substrate is ranging between 40% and 70%.

The separator of the present invention has enhanced thermal stability, and the thermal shrinkage rate in machine direction (MD) heating at 130° C. for 1 hour is less than 20%, and the thermal shrinkage rate in MD of the present separator heating at 150° C. for 1 hour is less than 40%.

The separator of the present invention has enhanced electrolyte wettability, and the contact angle between the surface of the separator and the carbonate electrolyte is less than 50°.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

Figure 1:
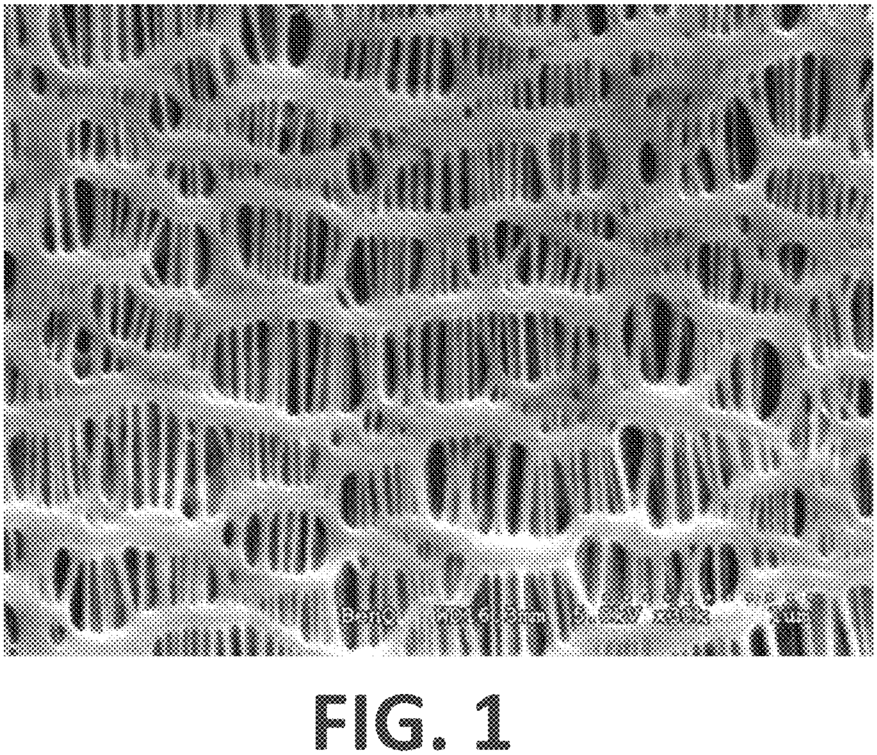
FIG. 1 (PRIOR ART)
FIG. 1 is a scanning electron microscope (SEM) image of the conventional dry-stretching separator at 30,000 magnifications.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The present invention discloses a separator for the lithium battery, with a low thermal shrinkage and an enhanced electrolyte wettability. The present separator comprises a porous polyolefin substrate with porous structures on the surfaces and interior thereof, and an anti-thermal shrinkage thin layer formed on the surfaces and the sidewalls of the porous structures of the porous polyolefin substrate.

In an embodiment of the present invention, the porous polyolefin substrate is a single-layered or multi-layered porous polyolefin substrate of polyethylene, polypropylene or copolymers thereof obtained by dry-stretching, for example, single-layered polyethylene, single-layered polypropylene, double-layered polyethylene/polypropylene or tri-layer polypropylene/polyethylene/polypropylene, but not limited thereto. In one embodiment of the present invention, the thickness of the porous polyolefin substrate is between 5 μm and 30 μm, preferably between 7 μm and 25 μm, and the porosity of the porous polyolefin substrate is between 40% and 70%, preferably between 43% and 65%.

In an embodiment of the present invention, the anti-thermal shrinkage thin layer is a composite layer of hexamethyldisilazane and titanium oxide and/or titanium hydroxide. In another embodiment of the present invention, the anti-thermal shrinkage thin layer is a composite layer of cross-linked polyolefin, photo-reactive agent, hexamethyldisilazane and titanium oxide and/or titanium hydroxide.

The thermal shrinkage rate in machine direction (MD) of the present separator heating at 130° C. for 1 hour is less than 20%, and the thermal shrinkage rate in MD thereof heating at 150° C. for 1 hour is less than 40%, and the contact angle between the surface of the separator and the carbonate electrolyte is less than 50°, which can improve the electrolyte wettability of the separator.

In an embodiment of the present invention, the anti-thermal shrinkage thin layer can be formed on the surfaces of the porous polyolefin substrate and the sidewalls of the porous structures of the porous polyolefin substrate by the methods of, for example but not limited to, chemical solution deposition, chemical vapor deposition or atomic layer deposition.

The separator disclosed in the present invention is prepared by a method comprising the steps of providing a porous polyolefin substrate with a plurality of porous structures on the surfaces and interior thereof; applying a precursor solution containing a 0.1 wt % to 5 wt % titanium alkoxide solution and a 0.1 wt % to 5 wt % hexamethyldisilazane to the porous polyolefin substrate; and applying a 30 wt % to 70 wt % alcohol solution to form an anti-thermal shrinkage thin layer on the surfaces and sidewalls of the porous structures of the porous polyolefin substrate.

The separator disclosed in the present invention can be prepared by another method comprising the steps of providing a porous polyolefin substrate with a plurality of porous structure on the surfaces and interior thereof; applying a precursor solution containing a 0.1 wt % to 5 wt % titanium alkoxide solution and a 0.1 wt % to 5 wt % hexamethyldisilazane to the porous polyolefin substrate, wherein the precursor solution further comprises a 150 ppm to 1500 ppm photo-reactive agent, and irradiating UV light with a radiation dose of 10 mJ/cm$^2$ to 1000 mJ/cm$^2$ to form an anti-thermal shrinkage thin layer on the surfaces and sidewalls of the porous structures of the porous polyolefin substrate.

In the method for preparing the present separator, the titanium alkoxide of the precursor solution is titanium methoxide, titanium ethoxide, titanium isopropoxide, titanium tert-butoxide, or combinations thereof, and is preferably titanium isopropoxide, and a solvent of the precursor solution is methanol, ethanol, isopropanol, or combinations thereof.

According to an embodiment of the method for preparing the present separator, the alcohol solution further comprises a tackifier to enhance the adherence of the titanium oxide and/or titanium hydroxide which is formed through the reaction of the titanium alkoxide with the alcohol solution, to the surfaces and the inner walls of the porous structures of the porous polyolefin substrate. Suitable tackifiers can be, for example but not limited to, poly(meth)acrylate, cross-linkable (meth)acrylic resin, poly-n-vinylacetamide, acrylonitrile-acrylate copolymer, acrylonitrile-acrylamide-acrylate copolymer, or combinations thereof.

The photo-reactive agent used in the precursor solution is 2-isopropylthioxanthone, thioxanthone, thioxanthone derivatives or combinations thereof.

Figure 2:
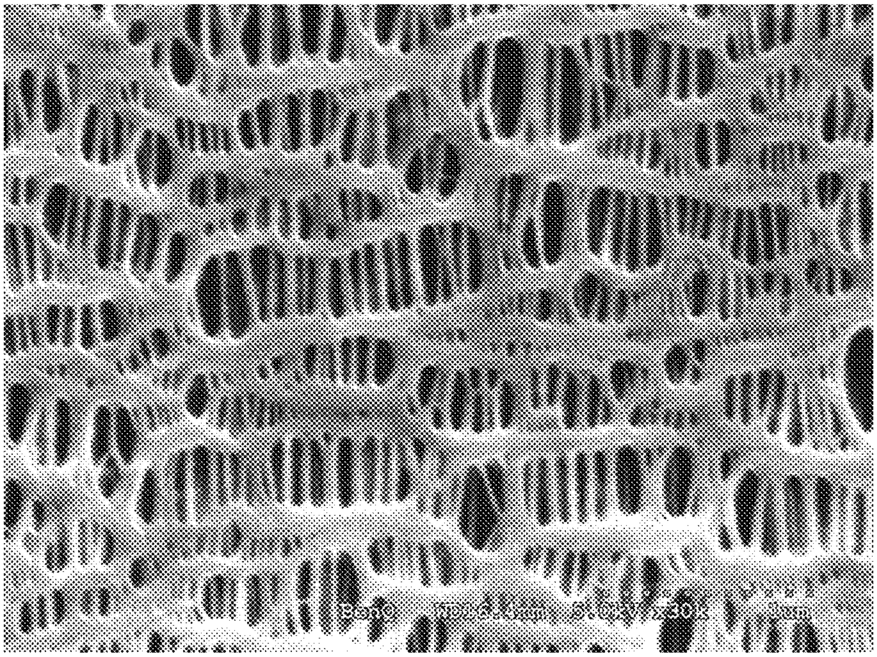
FIG. 2 is a scanning electron microscope (SEM) image of the present separator at 30,000 magnifications.
Figure 3:
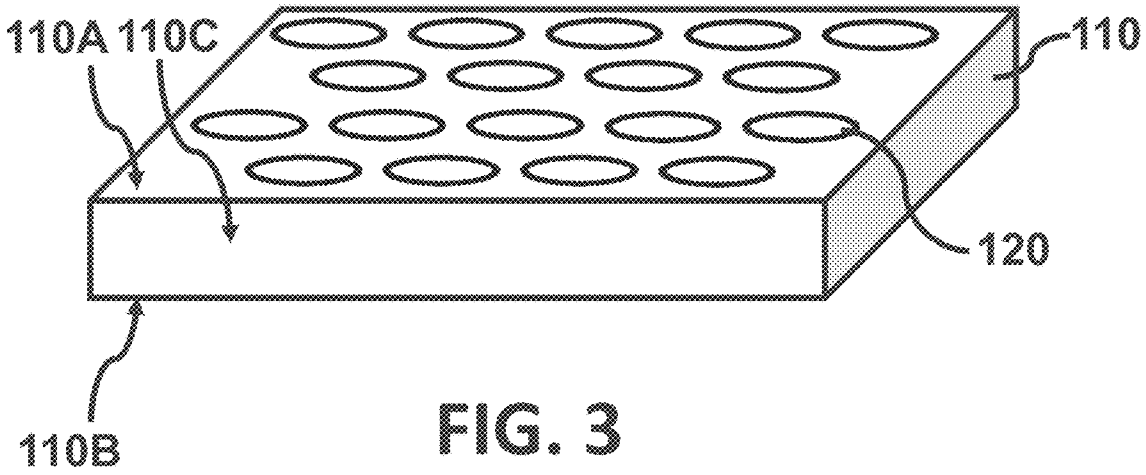
FIG. 3 (PRIOR ART)
FIG. 3 is a layered schematic diagram of the conventional dry-stretching separator shown in FIG. 1.
Figure 4:
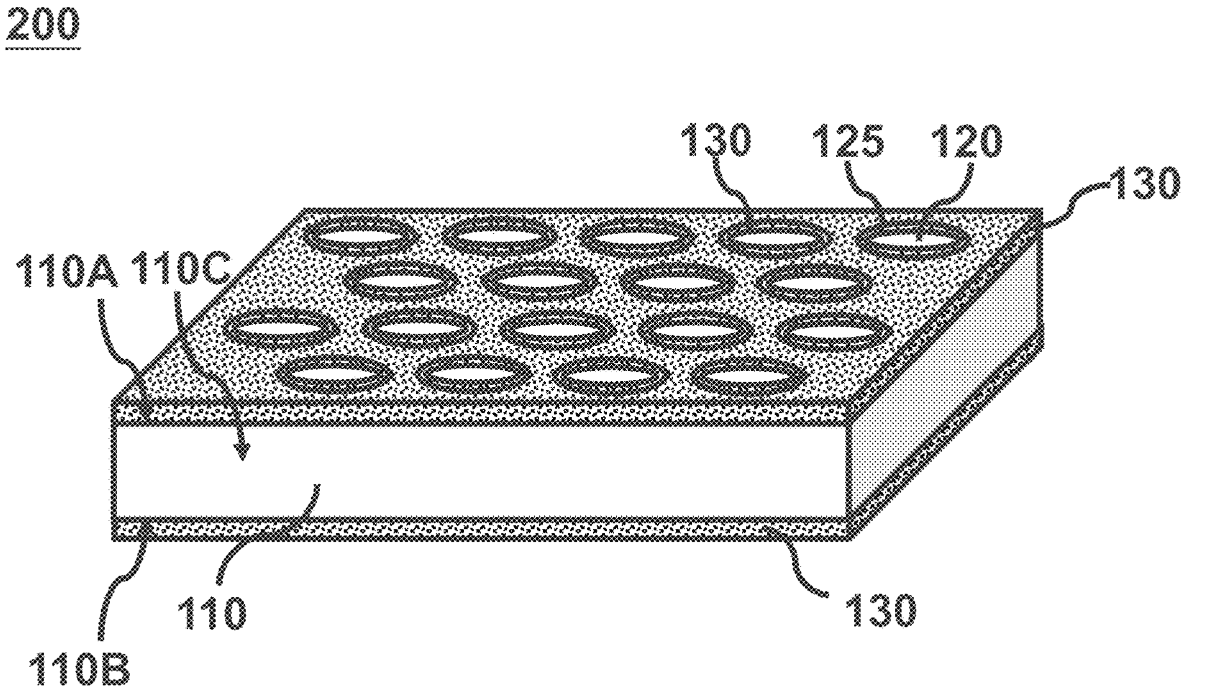
FIG. 4 is a layered schematic diagram of the present separator shown in FIG. 2.

In an example of an embodiment of the present invention, a porous polyolefin substrate with a thickness of 13.8 μm (triple-layered polypropylene/polyethylene/polypropylene separator, porosity 45%, available from BenQ Materials Corp.) was immersed in a precursor solution obtained by well-mixing 196.4 g of anhydrous alcohol (99.5%), 1.6 g of titanium isopropoxide and 2 g of hexamethyldisilazane, and took out from the solution and removed residual solution on the surface by a blade and then immersed in the ethanol solution obtained by mixing 98.4 g of deionized water, 98.4 g of ethanol (95%), 3 g of poly-N-vinylacetamide (PNVA GE191-107, available from Showa Denko K.K., Japan) and 0.13 g of acrylonitrile-acrylamide-acrylate copolymer (BM-950B, available from Zeon Co., Ltd., Japan). The porous polyolefin substrate was taken out and dried at 80° C. to form an anti-thermal shrinkage thin layer on the surfaces and the sidewalls of the porous structures of the porous polyolefin substrate The present separator has an anti-thermal shrinkage thin layer formed on the surfaces and the sidewalls of the porous structures of the porous polyolefin substrate without significantly increasing the total thickness thereof. FIG. 1 is a scanning electron microscope (SEM) image of the conventional dry-stretched separator 100 with a thickness of 13.8 μm at 30,000 magnifications. A layered schematic diagram of the conventional dry-stretched separator 100 is shown in FIG. 3. The dry-stretched separator 100 comprises a porous polyolefin substrate 110, wherein the surfaces 110A and 110B and the interior 110C of the porous polyolefin substrate 110 have a plurality of porous structures 120. FIG. 2 is a scanning electron microscope (SEM) image of the present separator 200 with a thickness of 13.8 μm at 30,000 magnifications. A layered schematic diagram of the present separator 200 is shown in FIG. 4. The present separator 200 comprises a porous polyolefin substrate 110 and an anti-thermal shrinkage thin layer 130, wherein the surfaces 110A and 110B and the interior 110C of the porous polyolefin substrate 110 have a plurality of porous structures 120, and the anti-thermal shrinkage thin layer 130 is formed on the surfaces 110A and 110B and the sidewalls 125 of the porous structures 120 of the porous polyolefin substrate 110. The thermal shrinkage test and the measurement of contact angle demonstrate that the present separator has a low thermal shrinkage and an enhanced electrolyte wettability.

The thermal shrinkage herein was tested by cutting the separator into a sample of 10 cm×10 cm, and the initial length in machine direction (MD) and the initial length in transverse direction (TD) were measured and marked as M0 and T0 on the center of the sample before testing. Then the marked sample was sandwiched between two A4 papers and heated in an oven at 130° C. and 150° C. respectively for 1 hr. After heating, the sample was moved out of the oven and put in the same environment as that of the thermal shrinkage measuring instrument for 30 minutes, and then the length in machine direction (MD) and the length in transverse direction (TD) were measured and marked as M1 and T1 and calculated in according with the following formula.

$$\text{Thermal shrinkage in machine direction(MD)rate (SMD)}=(M0-M1)/M0\times 100\%$$

$$\text{Thermal shrinkage in transverse direction(TD)rate (STD)}=(T0-T1)/T0\times 100\%$$

The electrolyte wettability of the present separator is explained by the measuring the contact angle. The contact angle of the separator was measured by the contact angle measuring instrument (Phoenix-150, available from Applied Microtech Inc., Taiwan), wherein propylene carbonate (PC, with a purity of 99%) was absorbed by a syringe with a needle diameter of 2 mm and installed on Phoenix-150, and the separator sample was fixed on the sample carrier of Phoenix-150, and then a volume droplet of the propylene carbonate (PC, with a purity of 99%) was injected onto the separator sample by the syringe, and the contact angle of the separator sample was determined after being measured with the optical system CCD and calculated by the computer software of Phoenix-150.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A separator, comprising: a porous polyolefin substrate with a plurality of porous structures on surfaces and interior thereof; and an anti-thermal shrinkage thin layer formed on the surfaces and sidewalls of the porous structures of the porous polyolefin substrate, wherein the anti-thermal shrinkage thin layer is a composite layer of cross-linked polyolefin, photo-reactive agent consisting of 2-isopropylthioxanthone, thioxanthone, thioxanthone derivatives, hexamethyldisilazane and titanium oxide and/or titanium hydroxide.

2. The separator as claimed in claim 1, wherein the porous polyolefin substrate is a single-layered polyethylene film, a single-layered polypropylene film, a double-layered polyethylene/polypropylene film or a triple-layered polypropylene/polyethylene/polypropylene film.

3. The separator as claimed in claim 1, wherein a thickness of the porous polyolefin substrate is ranging between 5 μm and 30 μm.

4. The separator as claimed in claim 1, wherein a porosity of the porous polyolefin substrate is ranging between 40% and 70%.

5. The separator as claimed in claim 1, wherein a thermal shrinkage rate in machine direction (MD) of the separator heating at 130° C. for 1 hour is less than 20%, and a thermal shrinkage rate in MD of the separator heating at 150° C. for 1 hour is less than 40%.

6. The separator as claimed in claim 1, wherein a contact angle between the surface of the separator and a carbonate electrolyte is less than 50°.

* * * * *